(12) United States Patent
Berceli et al.

(10) Patent No.: US 11,427,346 B2
(45) Date of Patent: Aug. 30, 2022

(54) CABLE RETAINER APPARATUS AND METHOD FOR RETAINING A CABLE

(71) Applicant: Gulfstream Aerospace Corporation, Savannah, GA (US)

(72) Inventors: Michael Berceli, Savannah, GA (US);
Paul Bradford, Savannah, GA (US);
Aaron Willson, Savannah, GA (US);
Patrick King, Savannah, GA (US);
Robert Norris, Savannah, GA (US);
Patrick Carver, Savannah, GA (US);
David Bryk, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 159 days.

(21) Appl. No.: 16/574,458

(22) Filed: Sep. 18, 2019

(65) Prior Publication Data
US 2020/0102088 A1    Apr. 2, 2020

Related U.S. Application Data

(60) Provisional application No. 62/738,219, filed on Sep. 28, 2018.

(51) Int. Cl.
*B64D 41/00* (2006.01)
*F16L 3/10* (2006.01)
*F16L 3/26* (2006.01)

(52) U.S. Cl.
CPC ............ *B64D 41/00* (2013.01); *F16L 3/1058* (2013.01); *F16L 3/26* (2013.01); *B64D 2221/00* (2013.01)

(58) Field of Classification Search
CPC ... B64D 41/00; B64D 2221/00; F16L 3/1058; F16L 3/26; H02G 3/32; B64C 1/38; B64C 1/36; B64C 1/406; B64C 3/26; B64C 7/00; B64C 1/26
USPC ......... 248/49, 55, 60, 67.7, 74.2, 74.3, 74.5; 244/131
See application file for complete search history.

(56) References Cited

U.S. PATENT DOCUMENTS

| | | | |
|---|---|---|---|
| 4,258,515 A | 3/1981 | Owen | |
| 5,456,199 A | 10/1995 | Kernkamp | |
| 6,343,954 B1 | 2/2002 | Facciano et al. | |
| 9,199,721 B2 * | 12/2015 | Cook | ........................ B64C 9/18 |
| 2005/0230547 A1 | 10/2005 | Giamati et al. | |
| 2010/0308169 A1 * | 12/2010 | Blanchard | ............... B29C 70/86 244/130 |
| 2012/0137653 A1 | 6/2012 | Facciano et al. | |
| 2015/0041600 A1 * | 2/2015 | Sampson | ............... F16L 3/1211 248/68.1 |
| 2015/0323101 A1 * | 11/2015 | Hobson | ................... F16L 3/127 29/525.08 |

(Continued)

FOREIGN PATENT DOCUMENTS

GB    2540792 A    2/2017

*Primary Examiner* — Muhammad Ijaz
(74) *Attorney, Agent, or Firm* — LKGlobal | Lorenz & Kopf, LLP

(57) ABSTRACT

Cable retainer apparatuses for retaining a cable, and aircraft and methods including such apparatuses are provided. In one example, a cable retainer for retaining a cable proximate a surface of an aircraft includes a cable retainer. The cable retainer is configured to retain the cable. A fairing is disposed about the cable retainer and is configured to couple to the aircraft to support the cable retainer adjacent to the surface of the aircraft.

17 Claims, 4 Drawing Sheets

(56) References Cited

U.S. PATENT DOCUMENTS

2020/0018427 A1\* 1/2020 Pisacreta ................. F16L 3/123
2020/0102088 A1\* 4/2020 Berceli ..................... F16L 3/26

\* cited by examiner

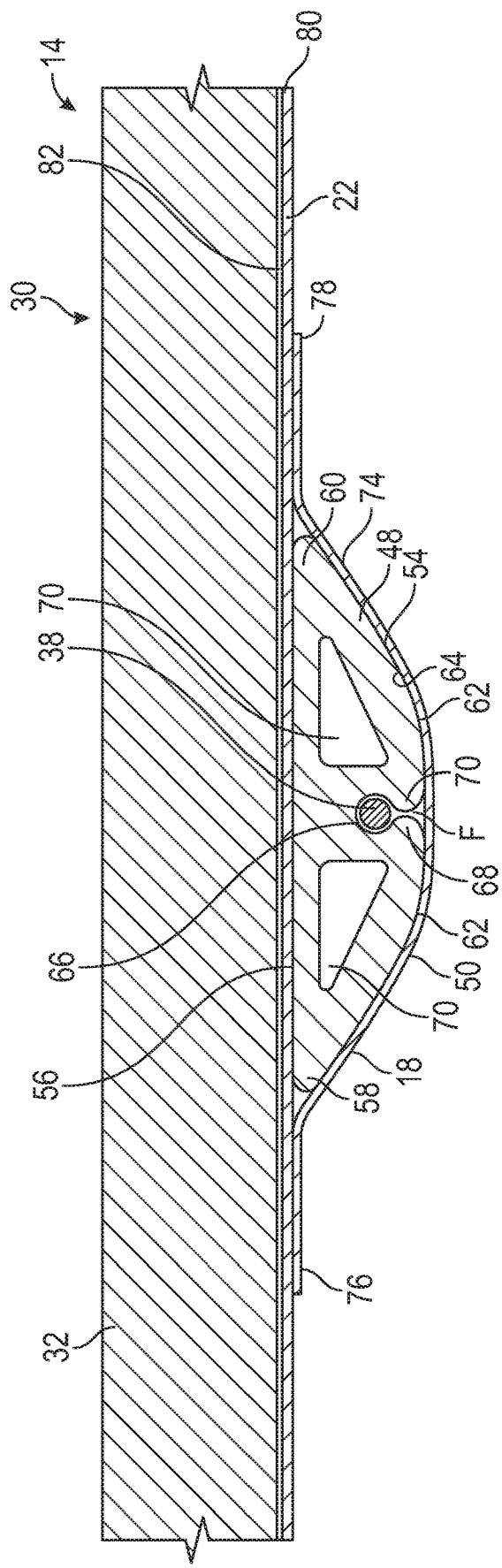
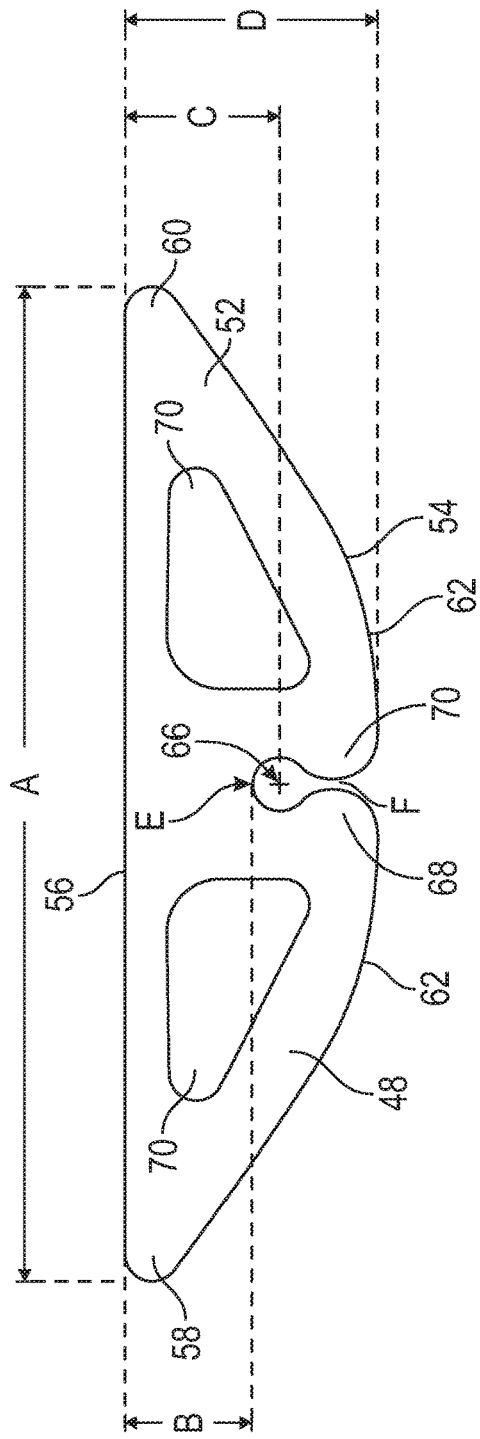

CABLE RETAINER APPARATUS AND METHOD FOR RETAINING A CABLE

CROSS-REFERENCE TO RELATED APPLICATIONS

This application is related to and claims all available benefit of U.S. Provisional Patent Application 62/738,219 filed Sep. 28, 2018, the entire contents of which are herein incorporated by reference.

TECHNICAL FIELD

The technical field relates generally to retaining a cable, and more particularly, relates to cable retainer apparatuses for retaining a cable, for example from an antenna mounted on a wing, of an aircraft, and aircraft and methods including such apparatuses.

BACKGROUND

In the aircraft industry, antennas and other components are often attached to the lower outer surfaces of aircraft wings. A cable, e.g., coaxial cable, is typically routed from each antenna or other component to inside the fuselage to a controller for communication between the corresponding antenna or other component and the controller.

Many aircraft have wings that include at least a portion of a fuel tank for fuel storage. Such aircraft wings are commonly referred to as "wet wings." When an antenna or other component is mounted on a wet wing, for example to the mid-core section on the lower outer surface of the wing directly below the fuel tank, routing of a cable from the antenna or other component to inside the fuselage to the controller becomes more challenging.

One way to route a cable from an antenna or other component mounted on a wet wing is through the interior structure portion of the wing adjacent to the fuel tank. However, FAA regulations, specifically CFR 25.981 entitled "Fuel Tank Ignition Prevention," require testing to confirm that any new designs to the aircraft structure or system do not induce a source of ignition that could ignite a fuel component (e.g., fuel vapor and/or liquid) in and/or around the fuel tank. As such, other approaches for routing a cable from an antenna or other component mounted on a wet wing that do not require additional testing per FAA regulations would be advantageous.

Accordingly, it is desirable to provide apparatuses for retaining a cable, for example away from a fuel tank on a wing, of an aircraft, and aircraft and methods including such apparatuses. Furthermore, other desirable features and characteristics of the various embodiments described herein will become apparent from the subsequent detailed description and the appended claims, taken in conjunction with the accompanying drawings and this background.

SUMMARY

Various non-limiting embodiments of a cable retainer apparatus for retaining a cable proximate a surface of an aircraft, an aircraft including such a cable retainer apparatus, and a method for retaining a cable from an antenna or other component that is disposed on a wing of an aircraft, are provided herein.

In a first non-limiting embodiment, the cable retainer apparatus includes, but is not limited to, a cable retainer that is configured to retain the cable. The cable retainer apparatus further includes, but is not limited to, a fairing that is disposed about the cable retainer. The fairing is configured to couple to the aircraft to support the cable retainer adjacent to the surface of the aircraft.

In another non-limiting embodiment, the aircraft includes, but is not limited to, a fuselage. The aircraft further includes, but is not limited to, a wing extending outward from the fuselage and having an outer surface. The aircraft further includes, but is not limited to, an antenna or other component disposed on the wing. The aircraft further includes, but is not limited to, a cable having a proximal section extending to a distal section. The proximal section is disposed adjacent to the antenna or other component and the distal section extends towards the fuselage. The aircraft further includes, but is not limited to, a cable retainer apparatus that is coupled to the outer surface of the wing adjacent to the antenna or other component. The cable retainer apparatus includes, but is not limited to, a cable retainer that retains the proximal section of the cable. The cable retainer apparatus further includes, but is not limited to, a fairing that is coupled to the aircraft and that is disposed about the cable retainer to support the cable retainer adjacent to the outer surface of the wing.

In another non-limiting embodiment, the method includes, but is not limited to, disposing a cable retainer adjacent to the antenna or other component. The method further includes, but is not limited to, advancing the cable into a cable channel disposed in the cable retainer. The method further includes, but is not limited to, coupling a fairing to the wing about the cable retainer.

BRIEF DESCRIPTION OF THE DRAWINGS

The various embodiments will hereinafter be described in conjunction with the following drawing figures, wherein like numerals denote like elements, and wherein:

FIG. 3 illustrates a cross-sectional view of the portion of the wing including the cable retainer apparatus depicted in FIG. 2 along line 3-3;

FIG. 4 illustrates a cross-sectional view of a cable retainer of the cable retainer apparatus depicted in FIG. 3;

DETAILED DESCRIPTION

The following Detailed Description is merely exemplary in nature and is not intended to limit the various embodiments or the application and uses thereof. Furthermore, there is no intention to be bound by any theory presented in the preceding background or the following detailed description.

Figure 1:
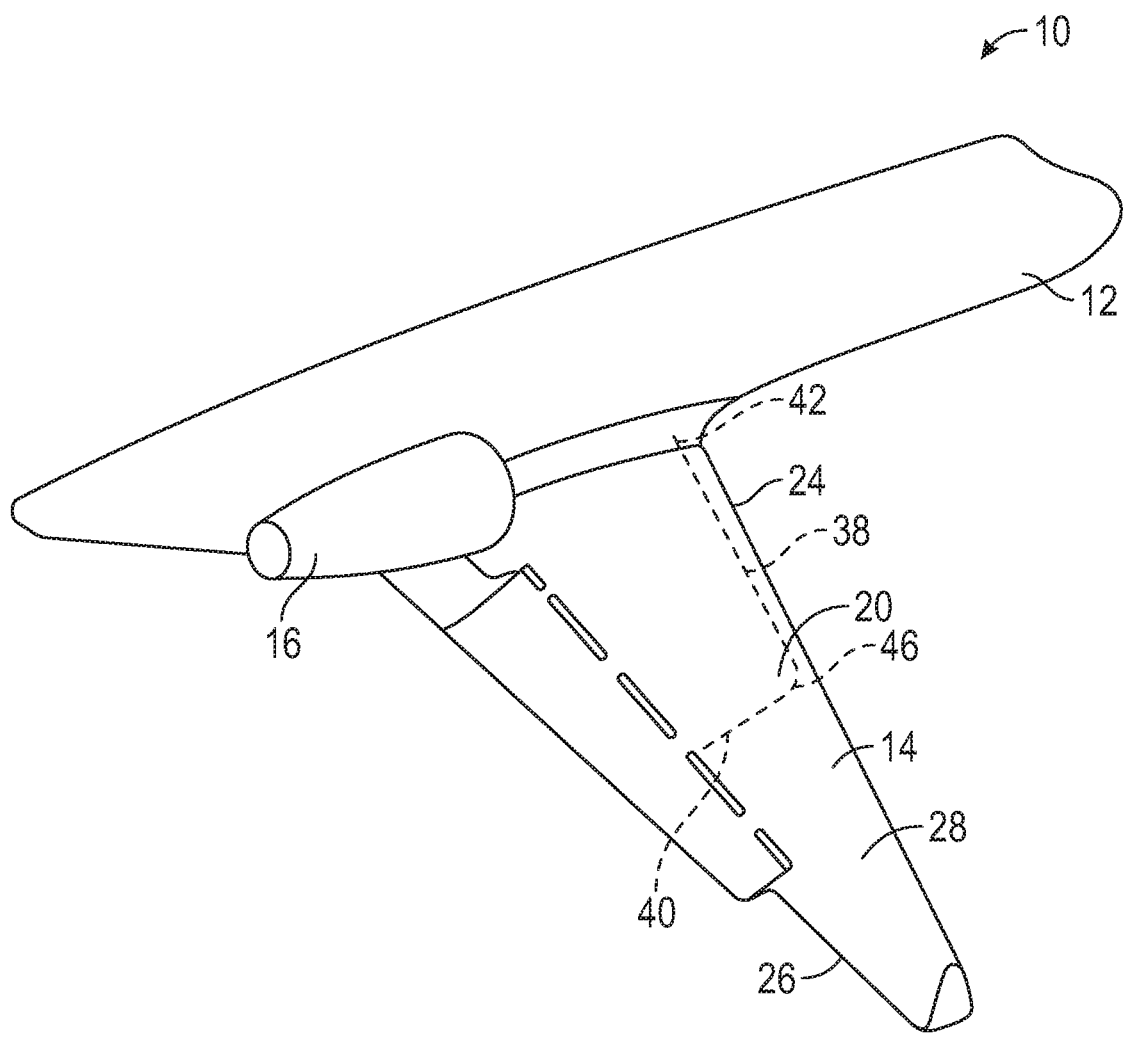
FIG. 1 illustrates a perspective top view of a portion of an aircraft in accordance with an exemplary embodiment.

FIG. 1 illustrates a perspective top view of a portion of an aircraft 10 in accordance with an exemplary embodiment. The aircraft 10 includes a fuselage 12 as the main body of the aircraft 10 that supports the wings 14 (only one wing shown) and tail (not shown). The wings 14 extend outwardly (outboard direction indicated by single headed arrow 15 shown in FIG. 2) from the fuselage 12. Depending on the design of the aircraft 10, the engines 16 (only one shown) may be attached to the wings 14, or alternatively, to the fuselage 12.

Figure 2:
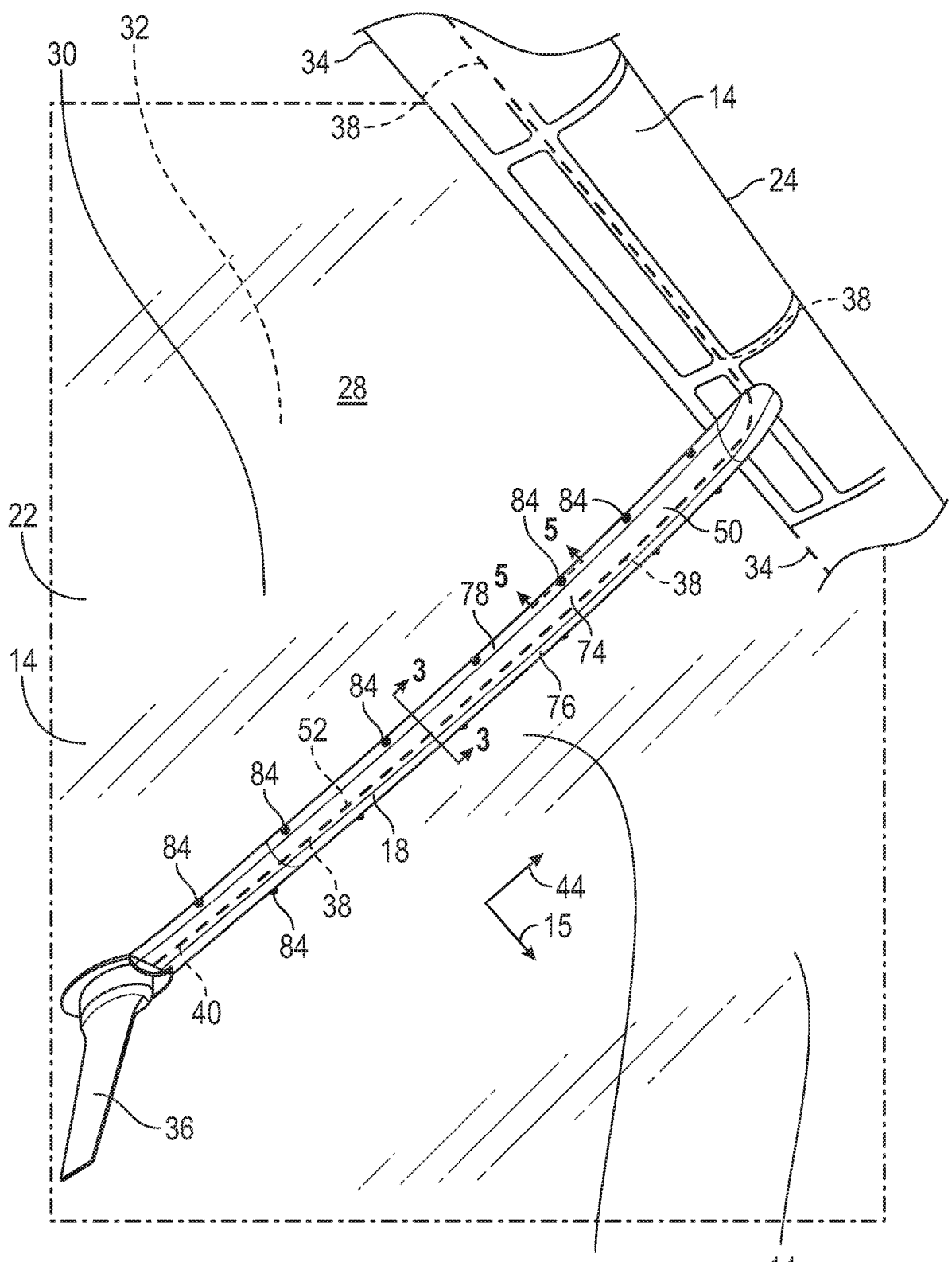
FIG. 2 illustrates a perspective bottom view of a portion of a wing including a cable retainer apparatus in accordance with an exemplary embodiment.

FIG. 2 illustrates a perspective bottom view of a portion of the wing 14 including a cable retainer apparatus 18 in accordance with an exemplary embodiment. Referring to FIGS. 1-2, the wing 14 has an upper outer surface 20 and a lower outer surface 22 opposite the upper outer surface 20. The upper and lower outer surfaces 20 and 22 extend between a leading edge portion 24 and a trailing edge portion 26 of the wing 14. In an exemplary embodiment, the wing 14 is a wet wing 28 that includes a wet wing portion 30, which includes at least a portion of a fuel tank 32 disposed therein between the lower and upper outer surfaces 20 and 22 with a forward and aft perimeter of the fuel tank 32 defining a fuel boundary 34. An antenna 36 is disposed on the wet wing portion 30 of the lower outer surface 22 of the wing 14 directly below the fuel tank 32. A cable 38, e.g., coaxial cable, that is coupled to the antenna 36 and extends therefrom. As illustrated, the cable has a proximal end section 40 disposed adjacent to the antenna 36 and extends to a distal end section 42 towards the fuselage 12.

In an exemplary embodiment, the cable retainer apparatus 18 is coupled to the lower outer surface 22 of the wing 14 adjacent to the antenna 36 and retains the proximal end section 40 of the cable 38. As illustrated, the cable retainer apparatus 18 extends between the antenna 36 and the leading edge portion 24, which extends forward (forward direction indicated by single headed arrow 44) of the wet wing portion 30 past the fuel boundary 34, to retain and guide the cable 38 from the antenna 36 past the fuel boundary 34. In an exemplary embodiment, the cable retainer apparatus 18 functions as a fuel barrier (e.g., additional fuel boundary) and provides retention of the proximal end section 40 of the cable 38 and further separation between the cable 38, which is disposed on the exterior portion of the wing 14, and the fuel tank 32, which is disposed on the inside of the wing 14. The distal end section 42 of the cable 38 which is disposed past both the cable retainer apparatus 18 and the fuel boundary 34 and therefore is not near the fuel tank 32, may be routed through the interior structure 46 of the leading edge portion 24 of the wing 14 towards the fuselage 12. Note, it is to be understood that although the cable retainer apparatus 18 is being described as retaining a cable 38 from an antenna 36 or other component to the leading edge portion 24 of the wing 14, other embodiments may use the cable retainer apparatus 18 as described herein for retaining a cable 38 from an antenna 36 or other component to the trailing edge portion 26.

Referring to FIGS. 1-4, in an exemplary embodiment, the cable retainer apparatus 38 includes a cable retainer 48 that retains the proximal section 40 of the cable 38, and a fairing 50 (e.g., relatively rigid material, for example plastic, composite, metal or aluminum or other rigid material sheet curved or otherwise formed to fit over the cable retainer 48) that is coupled to the aircraft 10 and disposed about the cable retainer 48 to support the cable retainer 48 adjacent to the lower outer surface 22 of the wing 14. In an exemplary embodiment, the cable retainer 48 is formed of a relatively compliant or flexible material that is fuel resistant. For example, the cable retainer 48 may be formed of an elastomeric material for example rubber, a polymeric material, and/or a composite material. Nitrile rubber is an example of an elastomeric material that has excellent fuel resistant. In an exemplary embodiment, the cable retainer material has a hardness durometer of about or less than about 80 Shore A, such as from about 50 Shore A to about 80 Shore A, such as from about 50 Shore A to about 75 Shore A, for example from about 56 Shore A to about 72 Shore A.

In an exemplary embodiment, the cable retainer 48 has a relatively low profile aerodynamic shape so as to have minimal effect on airflow across the lower outer surface 22 of the wing 14. In one example, the cable retainer 48 is an extruded or elongated body 52 having a cross-section with a substantially "D"-shaped outer profile 54 including a substantially linear section 56 coupled to opposing ends 58 and 60 of a substantially curved section 62. As illustrated, the substantially linear section 56 interfaces with the lower outer surface 22, e.g., outer skin surface, of the wing 14 of the aircraft 10 while the substantially curved section 62 interfaces with an inner surface 64 of the fairing 50. Other relatively low profile aerodynamic cross-sectional shapes for the cable retainer 48 may also be used.

In an exemplary embodiment, the cable retainer 48 has a length of from about 2 to about 6 feet, for example about 3 to about 4 feet, and may be continuous monolithic piece or may be formed in sections that are abutted end to end to form the elongated body 52. In an exemplary embodiment, the cable retainer 48 encases the proximal end section 40 of the cable 14 to shield the cable 14 from exposure to a fuel component, e.g., fuel leakage component, or the like.

In an exemplary embodiment, the cable retainer 48 has a cable channel 66 that retains the proximal end section 40 of the cable 14 and that extends longitudinally through the cable retainer 48 to route the cable 14 from the antenna 36 past the fuel boundary 34 to the leading edge portion 24 of the wing 14. Opposing positive features 68 and 70 (e.g., ribs, lips, nibs or the like) are disposed adjacent to the cable channel 66 and are substantially elastic or flexible such that the opposing positive features 68 and 70 can be moved from a nominal position away from each other for arranging the cable 14 in the cable channel 66 and spring back or return to the nominal position to retain the cable 14 in the cable channel 66.

As illustrated in FIG. 4, to facilitate positioning the cable 14 into the cable channel 66 of the cable retainer 48, a gap F is present between the opposing positive features 68 and 70 when in the nominal position. In an exemplary embodiment, the gap F is from about 0.02 to about 0.06 inches, for example about 0.04 inches.

Further and as illustrated, in an exemplary embodiment, the cable retainer 48 has the following dimensions A of from about 3.5 to about 4 inches, for example about 3.72 inches, dimension B of greater than 0.5 inches, for example about 0.51 inches or greater, such as about 0.51 to about 0.6 inches to provide continuous positive separation between the cable 14 and the lower outer surface 22 of the wing 14 under the fuel tank 32, dimension C of from about 0.55 to about 0.7 inches, for example about 0.61 inches, dimension D of from about 0.9 to about 1.1 inches, for example from about 0.95 to about 1 inches, such as about 0.97 inches to provide a relatively low profile shape, and diameter E of from about 0.15 to about 0.25 inches. It is to be understood that the dimensions provided above are non-limiting, and other suitable dimensions (A-F) for the cable retainer 48 may be used without departing from various embodiments described herein.

As illustrated in FIGS. 3-4, the cable retainer 48 may have one or more holes 70 formed therein spaced apart from the cable channel 66, for example to facilitate manufacturing, and/or reducing weight of the cable retainer 48. The hole(s)

70 may be elongated in the longitudinal direction of the cable retainer 48, for example as formed during an extrusion process, and may have any variety of cross-sectional shapes including a triangular or substantially triangular shape, other polygonal or substantially polygonal shape, curved or substantially curved shape, or the like. Alternatively, the cable retainer 48 may not have any holes formed therein spaced apart from the cable channel 66.

Figure 5:
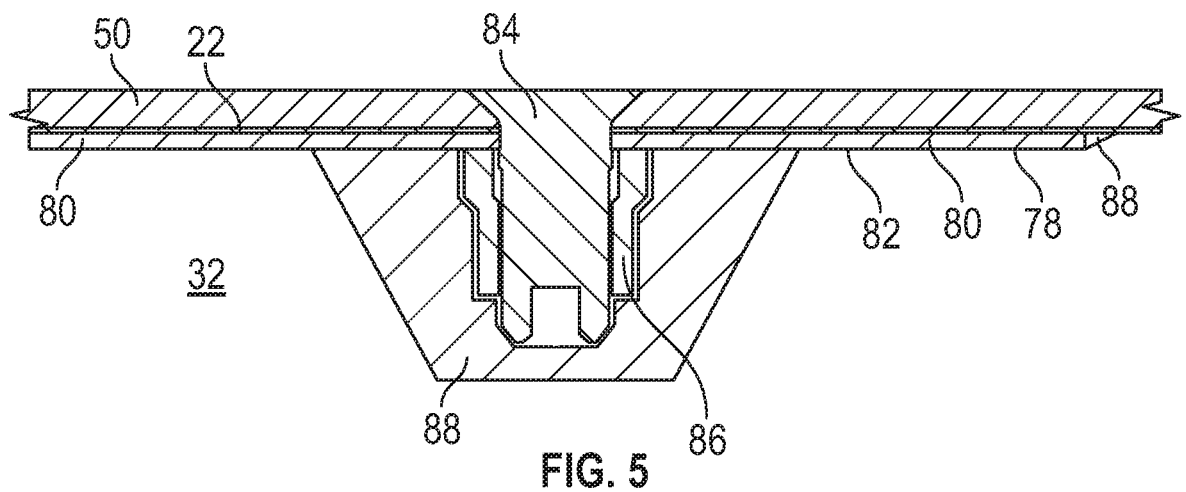
FIG. 5 illustrates a cross-sectional view of the portion of the wing including the cable retainer apparatus depicted in FIG. 2 along line 5-5 including a nut plate.

Referring to FIGS. 2-3 and 5, the cable retainer 48 and fairing 50 are cooperatively configured such that when the fairing 50 is coupled to the aircraft 10, there is an interference fit between the cable retainer 48 and the fairing 50, for example by having the volume formed between the inner surface 64 of the fairing 50 and the corresponding portion of the lower outer surface 22 of the wing 14 being slightly less than the volume defined by the outer profile 54 of the cable retainer 48. As such, the cable retainer 48 is slightly oversized relative to the volume provided by the fairing 50, thereby applying a compressive force to the cable retainer 48 when the fairing 50 is coupled to the lower outer surface 22 of the wing 14 to close off the gap F between the opposing positive features 68 and 70 and forming a sealingly tight fit to prevent the cable 14 from being exposed to a fuel component, fuel leakage component, or the like.

Additionally, there is an interference fit between the cable 14 and the cable retainer 48, for example by having the diameter of the cable channel 66 slightly less than the diameter of the cable 14. In an exemplary embodiment, advantageously the interference fit between the cable 14 and the cable retainer 48 prevents the cable 14 from vibrating within the cable retainer 48.

Figure 7:
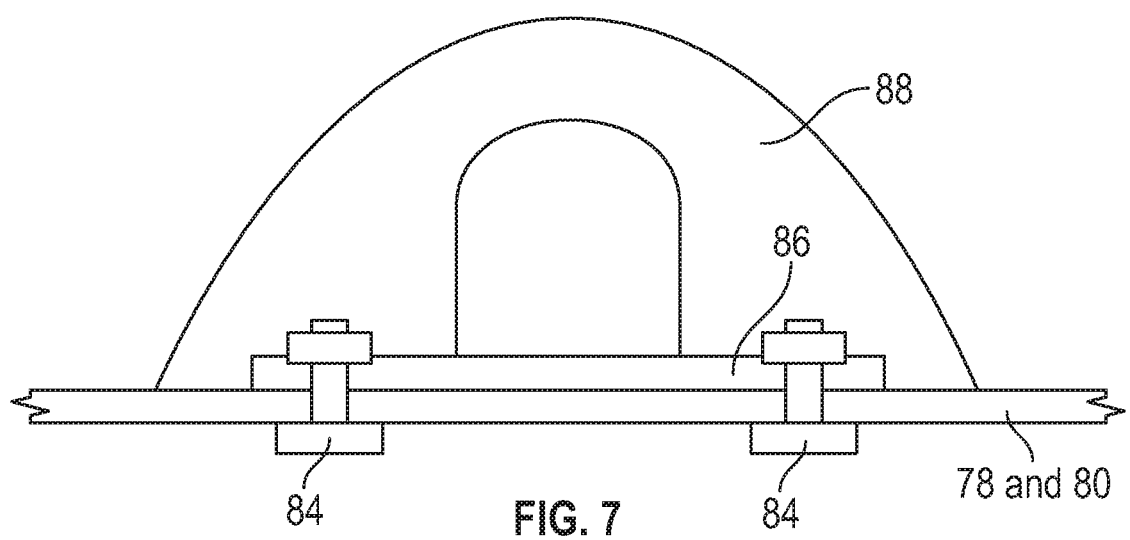
FIG. 7 illustrates a cross-sectional view of the portion of the wing including the cable retainer apparatus depicted in FIG. 2 along line 5-5 with an alternate nut plate design.

As illustrated, the fairing 50 has a curved section 74 that interfaces with the cable retainer 48 and flange sections 76 and 78 that extend outwardly in opposite directions from the curved section 74 and that interface with the lower outer surface 22 of the wing 14. In an exemplary embodiment, the wing 14 includes a skin 80 having the lower outer surface 22 and an inner surface 82 that is opposite the lower outer surface 22. A plurality of fasteners 84 extends through the flange sections 76 and 78 of the fairing 50 and the skin 80 into corresponding nut plates 86 to couple the fairing 50 to the wing 14. As illustrated, the nut plates 86 are disposed on the inner surface 82 of the skin 80 and a fuel tank sealant 88 is disposed over each of the nut plates 86 to seal the cable retainer apparatus 38 from any fuel leakage from the attachment areas. Note, FIG. 7 illustrates an alternative design for a nut plate 86.

Figure 6:
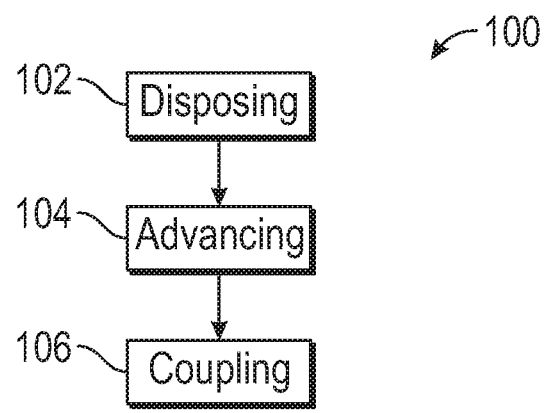
FIG. 6 illustrates a method for retaining a cable from an antenna that is disposed in a wing of an aircraft in aircraft in accordance with an exemplary embodiment.

Referring to FIG. 6, a method 100 for retaining a cable from an antenna that is disposed on a wing of an aircraft is provided. The method includes disposing (STEP 102) a cable retainer adjacent to the antenna. The cable from the antenna is advanced (STEP 104) into a cable channel that is disposed in the cable retainer. In one example, the cable is advanced into the cable channel by manually pressing the cable against opposing positive features that are disposed adjacent to the cable channel to move the opposing positive features from a nominal position away from each other for arranging the cable in the cable channel. A fairing is coupled (STEP 106) to the wing about the cable retainer.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. An aircraft comprising:
   a fuselage;
   a wing extending outward from the fuselage and having an outer surface;
   an antenna or other component disposed on the wing;
   a cable having a proximal section extending to a distal section, wherein the proximal section is disposed adjacent to the antenna or other component and the distal section extends towards the fuselage;
   a cable retainer apparatus coupled to the outer surface of the wing adjacent to the antenna or other component, wherein the cable retainer apparatus includes:
      a cable retainer retaining the proximal section of the cable; and
      a fairing coupled to the aircraft and disposed about the cable retainer to support the cable retainer adjacent to the outer surface of the wing, wherein the wing includes:
         a wet wing portion that includes at least a portion of a fuel tank disposed therein with a perimeter defining a fuel boundary, and wherein the antenna or other component is disposed on the wet wing portion; and
         an edge portion extending past the wet wing portion past the fuel boundary, and wherein the cable retainer apparatus extends between the antenna or other component and the edge portion to guide the cable from the antenna past the fuel boundary.

2. The aircraft of claim 1, wherein
   the cable retainer has a cable channel that extends longitudinally through the cable retainer that retains the proximal section of the cable and
   wherein the cable retainer and fairing cooperate such that a first interference fit is present between the cable retainer and the fairing, and a second interference fit is present between the cable and the cable retainer.

3. The aircraft of claim 2, wherein the cable retainer comprises an elastomeric material, a polymeric material, a composite material, or a combination thereof.

4. The aircraft of claim 2, wherein the cable retainer is formed of a material having a hardness durometer of about or less than about 80 Shore A.

5. The aircraft of claim 4, wherein the hardness durometer of the material is from about 50 Shore A to about 80 Shore A.

6. The aircraft of claim 2, wherein the cable retainer has a cross-section with a substantially D-shaped outer profile including a substantially linear section coupled to opposing ends of a substantially curved section.

7. The aircraft of claim 6, wherein the substantially linear section interfaces with a surface of the aircraft.

8. The aircraft of claim 6, wherein the substantially curved section interfaces with an inner surface of the fairing.

9. The aircraft of claim 2, wherein the cable retainer has opposing positive features that are disposed adjacent to the cable channel and that are configured to be moved from a nominal position away from each other for arranging the cable in the cable channel and to return to the nominal position to retain the cable in the cable channel.

10. The aircraft of claim 9, wherein a gap is defined between the opposing positive features in the nominal position.

11. The aircraft of claim 10, wherein the gap is from about 0.02 to about 0.06 inches.

12. The aircraft of claim 2, wherein the cable retainer has a substantially linear surface that interfaces with a surface of the aircraft, and wherein the cable channel is offset from the substantially linear surface a distance of greater than about 0.5 inches.

13. The aircraft of claim 2, wherein the cable retainer has one or more holes formed therein spaced apart from the cable channel.

14. An aircraft comprising:
a fuselage;
a wing extending outward from the fuselage and having an outer surface;
an antenna or other component disposed on the wing;
a cable having a proximal section extending to a distal section, wherein the proximal section is disposed adjacent to the antenna or other component and the distal section extends towards the fuselage;
a cable retainer apparatus coupled to the outer surface of the wing adjacent to the antenna or other component, wherein the cable retainer apparatus includes:
a cable retainer retaining the proximal section of the cable; and
a fairing coupled to the aircraft and disposed about the cable retainer to support the cable retainer adjacent to the outer surface of the wing, wherein the wing includes a skin having the outer surface and an inner surface that is opposite the outer surface, wherein the fairing has a flange section disposed adjacent to the outer surface, and wherein the cable retainer apparatus further comprises:
a nut plate disposed adjacent to the inner surface of the skin; and
a fastener extending through the flange section and the skin into the nut plate to couple the fairing to the wing.

15. The aircraft of claim 14, wherein the cable retainer apparatus further comprises a fuel tank sealant disposed about the nut plate.

16. A method for retaining a cable from an antenna or other component that is disposed on a wing of an aircraft, the method comprising:
providing the aircraft that comprises:
a fuselage;
the wing extending outward from the fuselage and having an outer surface;
the antenna or other component disposed on the wing;
the cable having a proximal section extending to a distal section,
wherein the proximal section is disposed adjacent to the antenna or other component and the distal section extends towards the fuselage;
a cable retainer apparatus coupled to the outer surface of the wing adjacent to the antenna or other component, wherein the cable retainer apparatus includes:
a cable retainer retaining the proximal section of the cable; and
a fairing coupled to the aircraft and disposed about the cable retainer to support the cable retainer adjacent to the outer surface of the wing, wherein the wing includes:
a wet wing portion that includes at least a portion of a fuel tank disposed therein with a perimeter defining a fuel boundary, and wherein the antenna or other component is disposed on the wet wing portion; and
an edge portion extending past the wet wing portion past the fuel boundary, and wherein the cable retainer apparatus extends between the antenna or other component and the edge portion to guide the cable from the antenna past the fuel boundary, wherein prior to providing the aircraft the method further comprising:
disposing the cable retainer adjacent to the antenna or other component;
advancing the cable into a cable channel disposed in the cable retainer; and
coupling the fairing to the wing about the cable retainer.

17. The method of claim 16, wherein advancing the cable comprises:
pressing the cable against opposing positive features that are disposed adjacent to the cable channel to move the opposing positive features from a nominal position away from each other for arranging the cable in the cable channel.

\* \* \* \* \*